No. 824,070. PATENTED JUNE 19, 1906.
H. A. DWYER.
GLASS MOLDING MACHINE.
APPLICATION FILED FEB. 2, 1906.
4 SHEETS—SHEET 1.
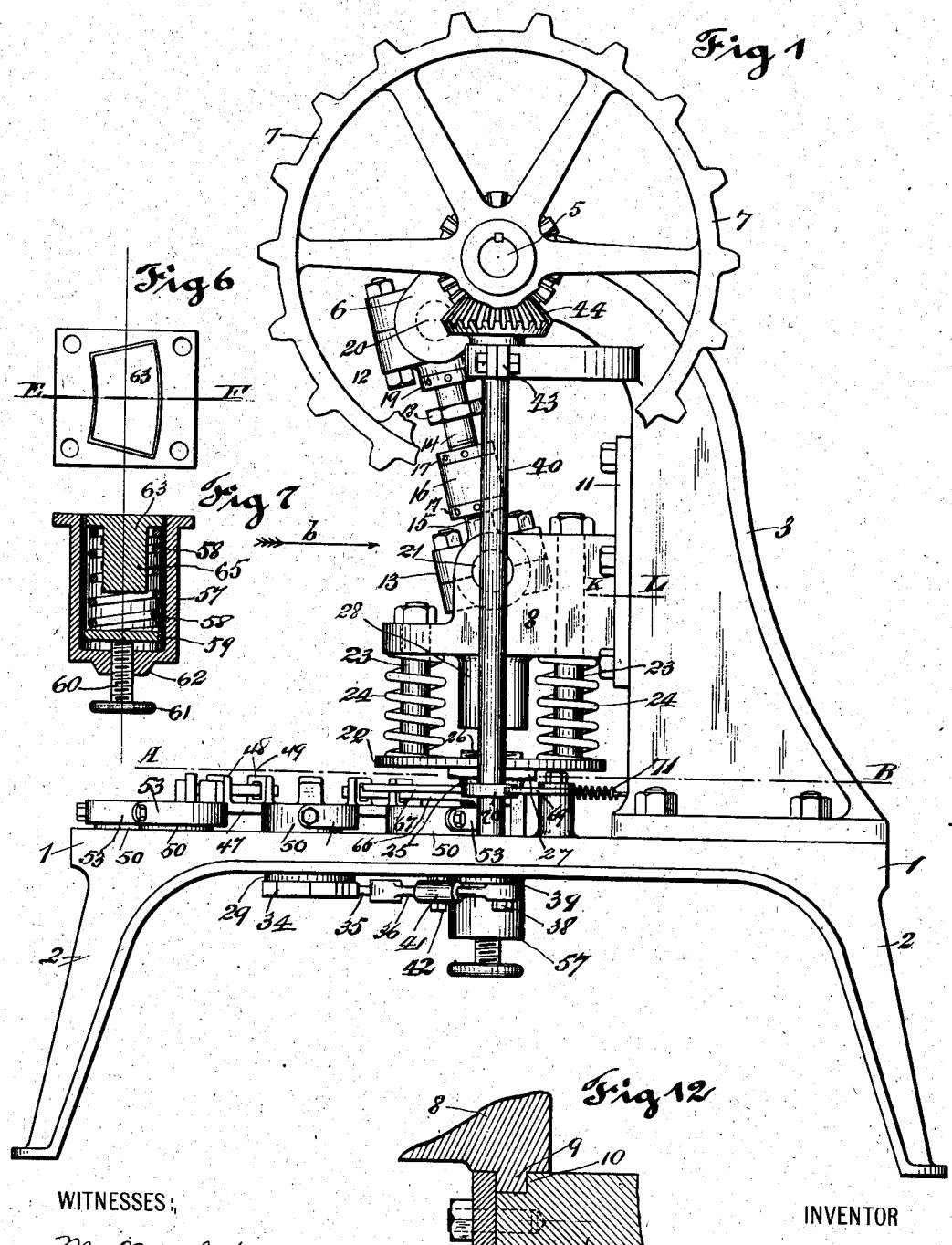
WITNESSES:
M. M. Depree.
J. M. Springer.
INVENTOR
Harry A. Dwyer
BY
Thompson & Bell
ATTORNEY

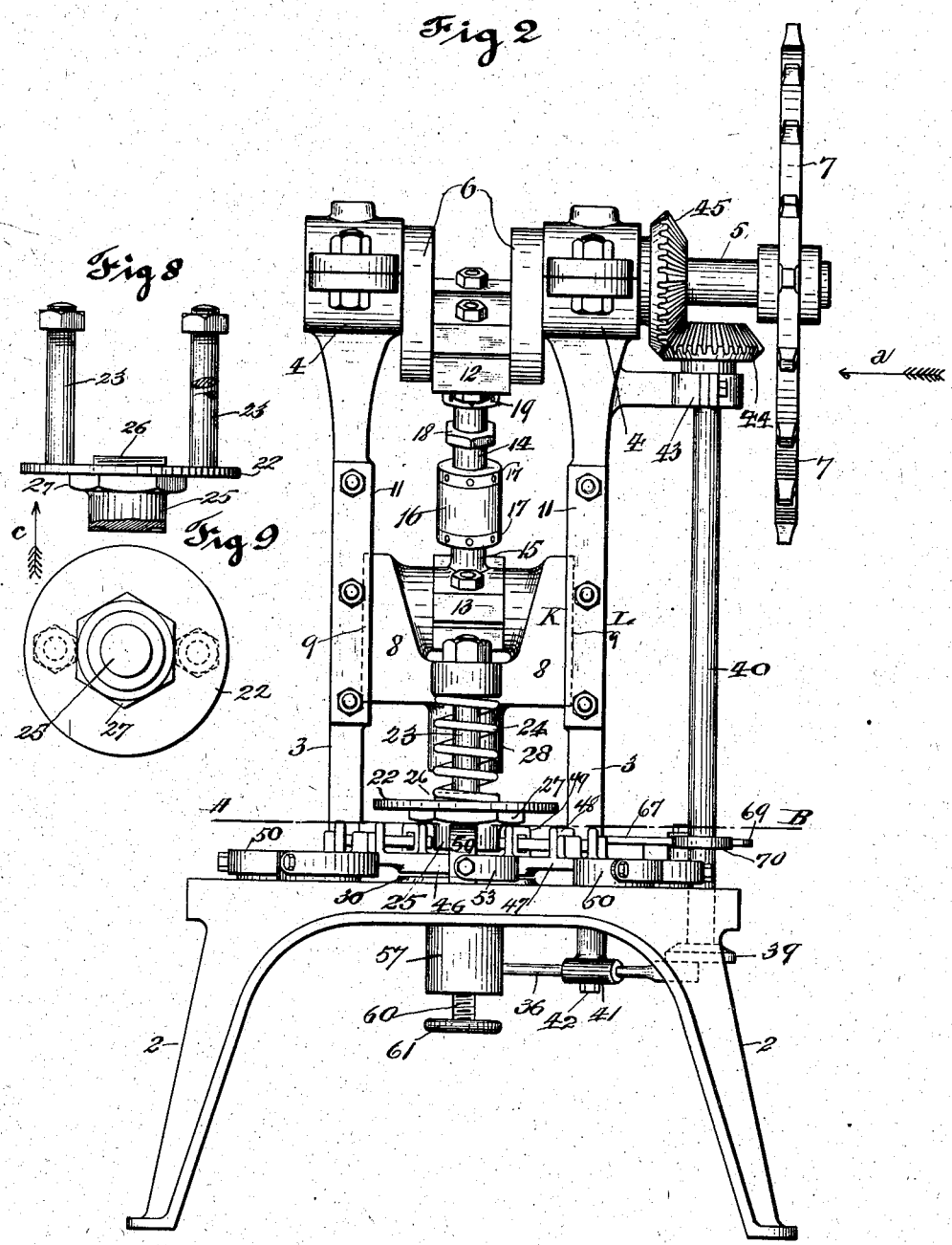

No. 824,070. PATENTED JUNE 19, 1906.
H. A. DWYER.
GLASS MOLDING MACHINE.
APPLICATION FILED FEB. 2, 1906.
4 SHEETS—SHEET 3.
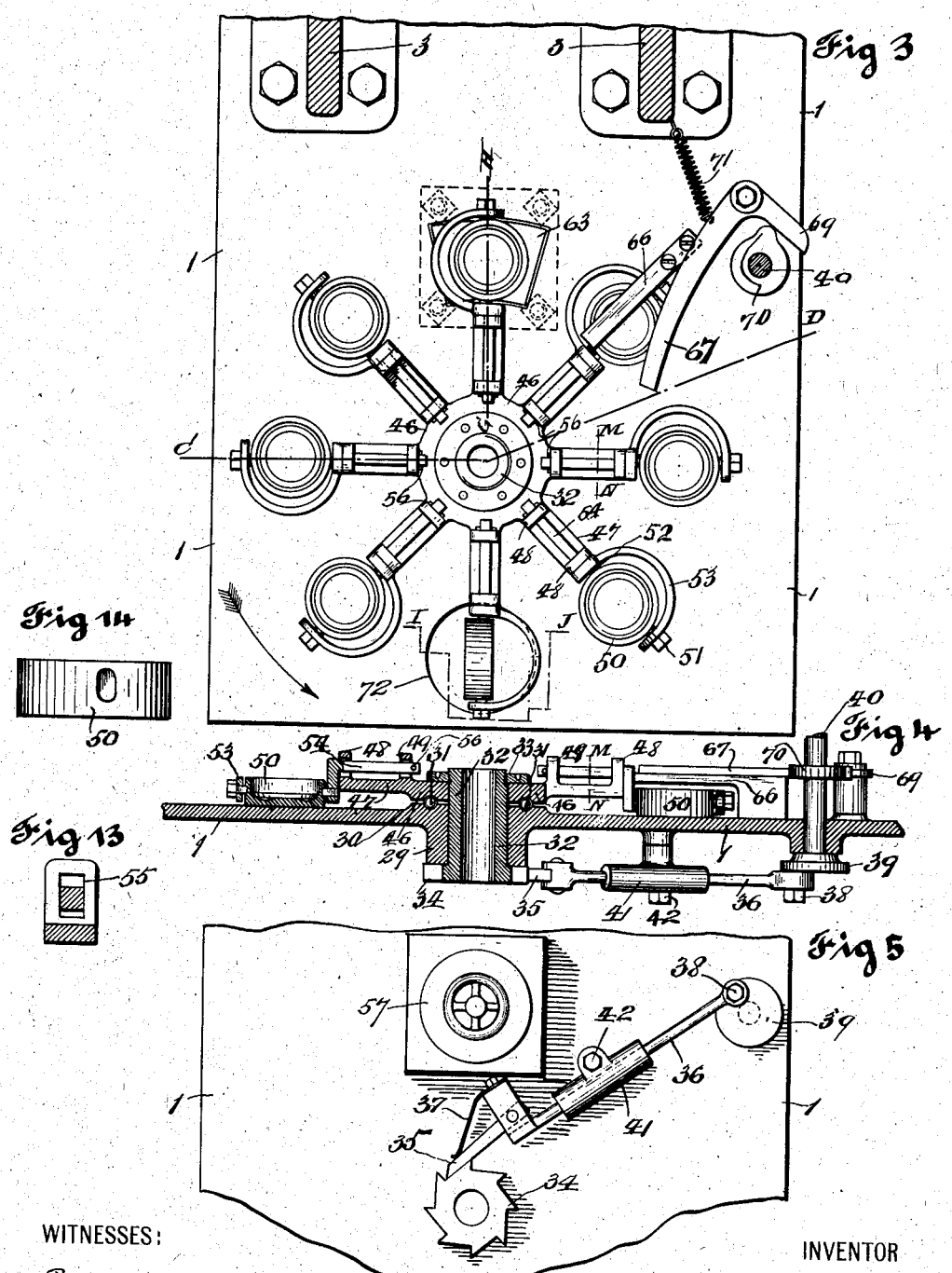
WITNESSES:
M. M. Depew.
J. M. Springer.
INVENTOR
Harry A. Dwyer
BY
Thompson & Bee
ATTORNEY

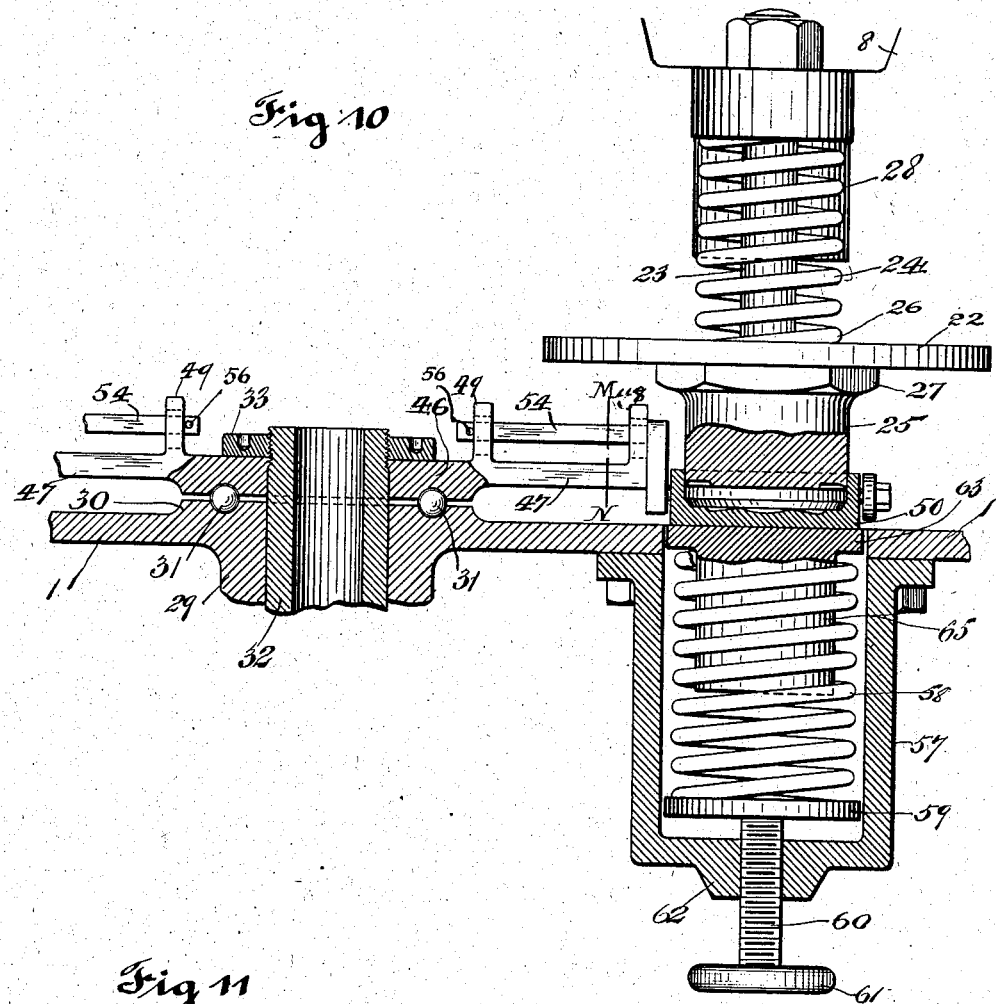

UNITED STATES PATENT OFFICE.

HARRY A. DWYER, OF MARION, INDIANA.

GLASS-MOLDING MACHINE.

No. 824,070.      Specification of Letters Patent.      Patented June 19, 1906.

Application filed February 2, 1906. Serial No. 299,075.

*To all whom it may concern:*

Be it known that I, HARRY A. DWYER, a citizen of the United States, residing at Marion, in the county of Grant and State of Indiana, have invented certain new and useful Improvements in Glass-Molding Machines, of which the following is a specification, reference being had therein to the accompanying drawings.

This invention relates to a glass-molding machine for molding cap-liners for the covers of fruit-jars, as will be hereinafter more fully described, and particularly pointed out in the claims.

The object of this invention is to provide a machine whereby a series of molds will be alternately brought into position first to receive the supply of molten glass, next to be moved in position under the forming-die or plunger of the machine, thence gradually moved to permit the newly-formed liner to be cooled before reaching the position to be discharged or dumped, and thence moved into position for the operator or gatherer to supply molten glass to the mold to again mold the same into the required form of liner; also, to provide a shearing means whereby the requisite amount of molten glass to make the required form of liner is clipped or severed from the glass collected by the gatherer and adhering to the end of the gatherer's rod, thereby preventing a superfluous amount of molten glass to be applied to or inserted into the mold and avoiding the production of liners of uneven or ununiform thickness. I attain these objects by means of the machine illustrated in the accompanying drawings, in which similar characters of reference designate like parts throughout the several views.

Figure 1 is a side elevational view of my invention of a machine for molding liners for fruit-jar covers, showing the main drive-wheel thereof broken to more clearly exhibit the mechanism situated back of it and looking in the direction of the arrow *a*. (See Fig. 2.) Fig. 2 is a front elevational view of the same looking in the direction of the arrow *b*. (See Fig. 1.) Fig. 3 is a detail broken sectional plan view of the same, taken through the line A B. (See Figs. 1 and 2.) Fig. 4 is a detail broken sectional view taken through the line C D. (See Fig. 3.) Fig. 5 is an inverted view of Fig. 3. Fig. 6 is a detail plan view of the yielding mold-supporting table. Fig. 7 is a sectional view of the same, taken through the line E F. (See Fig. 6.) Fig. 8 is an enlarged detail view of the die-carrying head. Fig. 9 is an inverted detail bottom view of the same looking in the direction of the arrow *c*. (See Fig. 8.) Fig. 10 is an enlarged broken detail sectional view of the mold-carrying spider and supporting-table of the machine, taken through the line G H. (See Fig. 3.) Fig. 11 is an enlarged detail broken sectional view taken through the line I J. (See Fig. 3.) Fig. 12 is an enlarged broken sectional view of the cross-head and its guide, taken through the line K L. (See Figs. 1 and 2.) Fig. 13 is a detail sectional view of one of the mold-carrying arms, taken through the line M N, (see Figs. 3, 4, and 10;) and Fig. 14 is an enlarged detail side exterior view of the mold, showing the pivotal-pin recess thereof.

The framework of this machine is composed of a table 1, trued or faced on its upper surface and supported on legs 2, and the standards 3, secured on said table. On the top ends of the standards 3 are formed the shaft-bearings 4, wherein the crank-shaft 5 is journaled. On the crank-shaft 5 is formed integral therewith the crank 6, which is situated between the bearings 4. Secured, as by a key or other suitable fastening means, on the prolonged end of the shaft 5 is the sprocket-wheel 7, whereby said shaft is revolved by a suitable sprocket-chain connected to a suitable driving-sprocket on a line or other power-driven shaft.

A cross-head 8 has its bearings 9 adapted to fit and to slide in the ways 10, formed in the standards 3, and said cross-head is retained in said ways by means of the outer guide bars or caps 11, which latter are securely bolted to the faces of the guideways of said standards. The cross-head 8 is moved upwardly or downwardly or reciprocated in its guideways 10 by a suitable adjustable connecting-rod composed of the upper and lower stub ends 12 and 13, the stems 14 and 15 of which are connected by a right and left hand turnbuckle 16, which latter is locked in position by suitable locking-nuts 17. A hexagonal collar 18 is formed integral on the upper stem 14, and the same is provided for the purpose of applying a spanner or wrench thereto to prevent a rotation of said stem when adjusting the rod. The stem 14 is threaded at both its ends, one end of which is screwed into the turnbuckle and the opposite or top end into the stub end 12, which latter end is locked to said stub end by a suitable locking-nut 19. The top or crank-pin stub end 12 is fitted on and connects the crank-pin 20 of the crank 6, and the bottom stub end 13 is fitted on and connects the wrist-pin 21 of the cross-head 8.

The die-carrying plate 22 is circular in form and is yieldingly connected to the cross-head 8, and the same is provided with vertically-extending parallel guide-bars 23, whereby said die-head is suspended from said cross-head, and said guide-bars are adapted to slide a limited extent in suitable bearings or bores formed in said cross-head 8. Surrounding said guide-bars and situated between the bottom end of the cross-head 8 and the top face of the die-carrying plate 22 are the coil-springs 24, which permit the die-carrying plate 22 to yield when the latter or the die-head carried by it contacts with an unyielding substance.

The die-head or rammer 25 is provided with a stem 26, which is threaded to be screwed into the central bore of the die-carrying plate 22 or is otherwise connected to said plate to be removable therefrom, and the said die or rammer 25 is provided with a hexagonal collar 27, whereby the die or rammer 25 may be removed by means of a suitable wrench or spanner. It is obvious that when the die or rammer 25 contacts with an unyielding substance, as a cooled or set piece of glass, said die or rammer carrying plate 22, owing to its being yieldingly connected, as described, to the cross-head 8, will yield or recede from the obstruction, thereby preventing a rupture or break in the machinery. A depending boss 28 is situated on the bottom side of the cross-head 8 directly and centrally over the die or plunger 25, and the same is provided to operate as a stop to limit the receding or backward movement of said die from the material under treatment.

The bottom side of the table 1 is provided with an integral depending boss 29, and on the top side of said table 1, directly above and concentrically with the boss 29, is a boss 30, which has its face grooved to receive the ball-bearings 31. The bosses 29 and 30 are bored to receive the sleeve 32, which sleeve is journaled therein, and the upper projecting end of said sleeve is threaded to receive the collar-nut 33, whereby the said sleeve is maintained in place in its journal-bearing. A further object of the said retaining or collar nut 33 is to serve the purpose of a clamping means whereby the slack of said sleeve-journal and the mold-carrying spider may be taken up to operate with a limited degree of freedom, thereby preventing an overrotation of said mold-carrying spider and insuring a prompt and positive regular movement to be imparted to the molds. On the bottom collar end of said sleeve 32, situated beneath the table 1, are formed the ratchet-teeth 34, which are adapted to be engaged by the spring-pawl 35, hingedly secured on the end of the sliding connecting-rod 36.

The pawl 35 is maintained in engagement with the ratchet-teeth 34 of the sleeve 32 by a retaining-pawl spring 37. The opposite or crank end of the sliding connecting-rod 36 is connected to the crank-pin 38, secured on the crank-disk 39, which latter is keyed or otherwise secured on the bottom end of the cam-shaft 40 to turn therewith, and said rod 36 is supported by and adapted to slide in the pivotal guide-sleeve 41, which is pivotally secured to the bottom side of the table 1 by a suitable bolt 42.

The vertically-extending cam-shaft 40 is journaled at its bottom end in a suitable bore formed in the table 1 and at or near its top end in a suitable bearing 43, formed integral on the adjacent standard 3, and the said shaft derives its motion from and by means of the bevel-gear 44, secured at the upper end thereof to turn therewith above said bearing 43, and said bevel-gear 44 is adapted to mesh with the bevel-gear 45, secured on the crank-shaft 5 to turn therewith.

The mold-carrying spider is composed of the center or boss portion 46, from which extend a series of radial arms 47, which latter are spaced at equal distances apart. Integral with and situated at the ends of the arms 47 are the upwardly or vertically extending lugs 48, and near the root ends thereof, adjacent to the central or boss portion 46 of said spider, are also situated similar lugs 49.

The glass-receiving molds or formers 50 rest upon the top trued surface of the table 1, and each is pivoted out of center or eccentrically at its opposite sides on the opposing pins 51 and 52, (see Fig. 4,) which pins are carried by the hooked ends 53 of the arms 54. The pivotal holes in the glass-receiving molds or formers 50 are preferably made oblong and extend in a vertical direction, so that the said mold or former 50 will be free to play in a vertical direction on its pivotal pins 51 and 52 while being moved or slid in their circular paths concentrically around their common center, which is the axis of the journal-sleeve 32.

The mold-carrying or hooked ends of the arms 54 are formed integral with the latter, and said arms are preferably rectangular in cross-section and loosely fit in the vertical guide-slots 55, formed in the lugs 48 and 49 to freely play upwardly and downwardly therein. The arms 54 are removably retained in position in their guide-slots by suitable retaining-pins 56.

It will be observed that the molds are moved in a circular path or revolved to be brought in rotation directly and centrally under the die or rammer 25 at the proper time to receive the latter by means of the pawl feed mechanism previously described, whereby the mold-carrying spider is intermittently rotated.

Secured by suitable bolts to the bottom of the table 1 centrally under the vertical center line of the die or rammer 25 is the supporting-sleeve 57 of the yielding mold-supporting table 63, hereinafter described, in the bore of which is situated the yielding table-supporting coil-spring 58, which spring is supported at its bottom end by the spring-plate 59, which loosely fits within the bore of said sleeve 57 and is adjustably supported therein by means of the spring-plate-adjusting screw 60, which latter is provided with a hand-wheel 61, whereby the screw 60, which is screwed in the boss 62 of the sleeve, is adjusted to raise or lower the screw-plate 59.

The yielding mold-supporting table 63 is segmental in form and is adapted to loosely fit in the segmental table-opening formed in the table 1 and situated directly under the die or rammer 25 and in the top or foot portion 64 of the sleeve 57, and the said table is provided with a depending cylindrical stem 65, which is adapted to be received by the top end of the coil-spring 58, and thus when an undue pressure is brought to bear upon the table and the mold supported by it said table 63 will yield to release the mechanism from undue or over stress.

A stationary shearing-knife 66 is secured on the top of the table 1 in position thereon to extend over that mold situated next adjacent to that position to next pass under the pressing die or rammer 25—that is to say, over that mold situated on the machine where the operator or gatherer supplies the requisite amount of molten glass to the mold. On the face of the table 1 is also mounted the oscillating shear or knife-blade 67, which is pivoted to the face of said table by its pivotal bolt 68. Integral with the shear 67 is the cam-arm 69, which latter arm is adapted to be engaged by the cam 70, secured on the cam-shaft 40, whereby the shear 67 is positively operated to be removed from the mold after having clipped the molten glass or severed it from the rod of the gatherer. The motion of the shear 67 toward the fixed or stationary shear 66 to clip the glass must be of a yielding nature, and with this purpose in view I provide a coil-spring 71, which latter yieldingly moves the shear 67 against the molten glass supplied to the mold by the operator or attendant to sever the same. Should the glass have set or become hardened and is still in a warm state, the shear 67 will not, owing to the yielding spring 71, break or crumble the glass, thereby causing hot splinters or fine portions of glass flying in the face of the operator to injure him, which would very frequently happen were a positive motion imparted to the shear 67.

Situated in the paths of the molds 50 directly opposite the vertical center line of the path of the die or rammer 25 is the dumping-aperture 72, which is provided for the purpose of permitting the free rotation or downward swing of the molds 50 on their pivotal pins 51 and 52 to permit each of the molds when they reach this point to discharge the molded glass liner, which at this portion of the path of the mold is cooled.

It will be readily understood that the mold 50 when supported by and resting upon the trued upper surface of the table 1 will be at all times throughout the remainder of its path maintained firmly in a horizontal position; but immediately the molds reach the dumping-opening 72, there being no support for the molds at this point and the latter being supported eccentrically on their pivotal pins 51 and 52, they will drop or assume a vertical position, as shown particularly in the plan view, Fig. 3, and the enlarged detail, Fig. 11, at which position the liner L, as shown particularly in Fig. 11, will be discharged from its mold.

It is clear that a single arm 47, extending from a fixed center to revolve around said fixed center, would be operative; but by the use of such a single arm considerable time would be lost, since one mold only would make the complete circle. It is therefore obvious that a plurality of molds are necessary to accomplish the work in a practical and economical manner, and the number or series of molds employed in one machine is limited by the velocity of rotation or the period of rest of the molds sufficient for the gatherer to supply the material thereto. The number of molds therefore required in a machine is limited only to the capacity of the attendant or gatherer to supply the molds with the requisite amount of molten glass.

Having thus fully described this my invention, what I claim as new and useful, and desire to cover by Letters Patent of the United States therefor, is—

1. In a glass-molding machine, the combination with a supporting-table, a journal situated at right angles to and projecting above the trued horizontal surface of said table, an arm extending radially and horizontally therefrom, a journal retaining and clamping nut, a mold-carrier yieldingly connected to said radial arm and a mold eccentrically pivoted to said mold-carrier and resting on said table, of a die or rammer situated vertically over the center of the path of said mold, and means for continuously reciprocating said die or rammer and for revolving said arm at regular and equal intervals to move said mold along equal portions of its circular path.

2. In a glass-molding machine, the combination with a rigid supporting-table, a journal situated at right angles to and projecting above the surface thereof, an arm extending radially therefrom and a mold eccentrically pivoted to said arm and resting on said table, of a die or rammer situated vertically over the path of said mold, a yielding table situated directly under the said die to support the mold to yieldingly resist the pressure of said die and means for reciprocating said die or rammer and for intermittently revolving said arm to move said mold into position under and from said die.

3. In a glass-molding machine, the combination with a rigid supporting-table, a journal situated at right angles to and projecting above the surface thereof, an arm extending radially therefrom and a mold eccentrically pivoted to said arm and resting on said table, of a die or rammer situated at one side of said journal and vertically over a point in the path of said mold, a yielding table situated directly under the said die to support the mold and to resist the pressure of the said die and means for continuously reciprocating said die or rammer and for intermittently revolving said arm to move said mold into position under and from said die.

4. In a glass-molding machine, the combination with a rigid supporting-table, a journal situated centrally of, at right angles to and projecting above the surface thereof, an arm extending radially therefrom, and a mold eccentrically pivoted to said arm and resting on said table, said table provided with a yielding-table-receiving opening and a dumping-opening situated in the path of said mold on the diametrically opposite side of said journal, a mold-supporting table yieldingly supported in said mold-supporting-table opening, of a reciprocating cross-head, cross-head guides and a die or rammer yieldingly connected to said cross-head and situated directly over said mold-supporting yielding table and means for continuously reciprocating said cross-head and for revolving said arm at regular intervals to move or traverse said mold along equal portions of its circular path.

5. In a glass-molding machine, the combination with a rigid supporting-table, a journal situated centrally of, at right angles to and projecting above the surface thereof, an arm extending radially therefrom, and a mold eccentrically pivoted to said arm and resting on said table, said table provided with a yielding-table-receiving opening and a dumping-opening situated in the path of said mold on the diametrically opposite side of said journal, a mold-supporting yielding table situated in said yielding-table-receiving opening, of a reciprocating cross-head, cross-head guides, and a die or rammer yieldingly connected to said cross-head and situated directly over said mold-supporting yielding table, and means for continuously reciprocating said cross-head, a spider-operating ratchet-wheel, a pawl, and means for operating said pawl to move said arm at regular intervals to move or traverse said mold along equal portions of its circular path.

6. In a glass-molding machine, the combination with a rigid supporting-table, a journal situated centrally of, at right angles to, and projecting above the surface thereof, a spider comprising a central portion and a series of equally-spaced radially-extending arms, said spider secured on said journal to revolve therewith, mold-carrying arms or stems removably secured to said radial arms to play in a vertical direction, a mold eccentrically pivoted to each of said mold-carrying arms or stems and resting on the surface of said supporting-table, said table provided with a yielding-table-receiving opening and a mold-dumping opening situated in the path of said molds on the diametrically opposite side of said journal, a mold-supporting yielding table situated in said yielding-table-receiving opening, of a reciprocating cross-head, vertically-extending cross-head guides, a die-carrying plate yieldingly connected to said cross-head, a die or rammer removably secured to said plate and situated centrally over said mold-supporting yielding table, a spider-operating ratchet-wheel, a pawl, and means for operating said pawl to move said arm at regular intervals to move or traverse said mold along equal portions of its circular path.

7. In a glass-molding machine, the combination with a rigid supporting-table, a journal situated centrally of, at right angles to, and projecting above the surface thereof, a spider comprising a central portion and a series of equally-spaced radially-extending arms, said spider secured on said journal to revolve therewith, mold-carrying arms or stems removably secured to said radial arms to play in a vertical direction, a mold eccentrically pivoted to each of said mold-carrying arms or stems and resting on the surface of said supporting-table, said table provided with a yielding-table-receiving opening and a mold-dumping opening situated in the path of said molds on diametrically opposite sides of said journal, a mold-supporting yielding table situated in said yielding-table-receiving opening, means for dividing and equalizing the supply of glass to each of said molds, of a reciprocating cross-head, vertically-extending cross-head guides, a die-carrying plate yieldingly connected to said cross-head, a die or rammer removably secured to said plate and situated centrally over said mold-supporting yielding table, a spider-operating ratchet-wheel, a pawl, and means for operating said pawl to move said arm at regular intervals to move or traverse said mold along equal portions of its circular path.

8. In a glass-molding machine, the combination with a rigid supporting-table, a journal situated centrally of, at right angles to, and projecting above the surface thereof, a spider comprising a central portion and a series of equally-spaced radially-extending arms, said spider secured on said journal to revolve therewith, mold-carrying arms or stems removably secured to said radial arms to play in a vertical direction, a mold eccentrically pivoted to each of said mold-carrying arms or stems and resting on the surface of said supporting-table, said table provided with a yielding mold-supporting-table opening and a mold-dumping opening situated in the path of said molds on the diametrically opposite side of said journal, a mold-supporting yielding table situated in said yielding mold-supporting-table opening, a shearing means comprising a fixed shear or knife situated to extend horizontally over the last of the series of empty molds or the mold next preceding in position to that mold situated under the die and a shear pivoted adjacent to said fixed shear, means for yieldingly operating said pivotal shear to sever the glass and for positively opening said shear, of a reciprocating cross-head, vertically-extending cross-head guides, a die-carrying plate yieldingly connected to said cross-head, a die or rammer removably secured to said plate and situated centrally over said mold-supporting yielding table, a spider-operating ratchet-wheel, a pawl, and means for operating said pawl to move said arm at regular intervals to move or traverse said mold along equal portions of its circular path.

9. In a glass-molding machine, the combination with a rigid supporting-table, a journal situated centrally of, at right angles to, and projecting above the surface thereof, a spider comprising a central portion and a series of equally-spaced radially-extending arms, vertically-extending lugs on said arms provided with mold-carrying arm or stem receiving openings, mold-carrying arms or stems removably secured in said lug-openings to play vertically therein, said spider secured on said journal to revolve therewith, a mold eccentrically pivoted to each of said mold-carrying arms or stems and resting on the surface of said supporting-table, said table provided with a yielding mold-supporting-table opening and a mold-dumping opening situated in the path of said molds on the diametrically opposite side of said journal, a mold-supporting yielding table situated in said yielding mold-supporting-table opening, a shearing means comprising a fixed shear or knife situated to extend horizontally over the last of the series of empty molds or the mold next preceding in position to that mold situated under the die and a shear pivoted adjacent to said fixed shear, means for yieldingly operating said pivotal shear to sever the glass and for positively opening said shear, of a reciprocating cross-head, vertically-extending cross-head guides, a die-carrying plate yieldingly connected to said cross-head, a die or rammer removably secured to said plate and situated centrally over said mold-supporting yielding table, a spider-operating ratchet-wheel, a pawl, and means for operating said pawl to move said arm at regular intervals to move or traverse said mold along equal portions of its circular path.

10. In a glass-molding machine, the combination with a rigid supporting-table, a spider-carrying journal situated centrally of, at right angles to, and projecting above the surface thereof, a spider comprising a central portion and a series of equally-spaced radially-extending arms, vertically-extending lugs on said arms provided with mold-carrying arm or stem receiving openings, mold-carrying arms or stems removably secured in said lug-openings to play vertically therein, said spider secured on said journal to revolve therewith, a spider-clamping nut situated on said spider-journal whereby the play of said spider is regulated, a mold eccentrically pivoted to each of said mold-carrying arms or stems and resting on the surface of said supporting-table, said table provided with a yielding mold-supporting-table opening, and a mold-dumping opening situated in the path of said molds on the diametrically opposite side of said journal, a mold-supporting yielding table situated in said yielding mold-supporting-table opening, a shearing means comprising a fixed shear or knife situated to extend horizontally over the last of the series of empty molds or the mold next preceding in position to that mold situated under the die and a shear pivoted adjacent to said fixed shear, means for yieldingly operating said pivotal shear to serve the glass and for positively opening said shear, of a reciprocating cross-head vertically-extending cross-head guides, a die-carrying plate yieldingly connected to said cross-head, a die or rammer removably secured to said plate and situated centrally over said mold-supporting yielding table, a spider-operating ratchet-wheel, a pawl, and means for operating said pawl to move said arm at regular intervals to move or traverse said mold along equal portions of its circular path.

11. In a glass-molding machine, the combination with a rigid supporting-table, a spider-carrying journal situated centrally of, at right angles to and projecting above the surface thereof, a spider comprising a central portion and a series of equally-spaced radially-extending arms, said spider secured on said journal to revolve therewith, a spider-clamping nut situated on said spider-journal whereby the play of said spider is regulated, vertically-extending lugs on said arms provided with mold-carrying arm or stem receiving openings, mold-carrying arms or stems removably secured in said lug-openings to play vertically therein, crooked mold-receiving ends on the outer ends of said stems, molds eccentrically pivoted in said crooked ends and resting on the surface of said supporting-table, said table provided with a yielding mold-supporting-table opening and a mold-dumping opening situated in the path of said molds on the diametrically opposite side of said journal, a mold-supporting yielding table situated in said yielding mold-supporting-table opening, a shearing means comprising a fixed shear or knife situated to extend horizontally over the last of the series of empty molds or the mold next preceding in position to that mold situated under the die and a shear pivoted adjacent to said fixed shear, a spring for closing said shear, a vertically-extending cam-shaft, a cam on said shaft for positively operating said pivotal shear to open, and means for yieldingly operating said pivotal shear to sever the glass and for positively opening said shear, of an overhead horizontally-extending crank-shaft, a vertically-reciprocating cross-head, a cross-head connecting-rod, vertically-extending cross-head guides, a die-carrying plate yieldingly connected to said cross-head, a die or rammer removably secured to said plate, and situated centrally over said mold-supporting yielding table, a spider-operating ratchet-wheel, a pawl and means for operating said pawl to move said arm at regular intervals to move or traverse said mold along equal portions of its circular path.

12. In a glass-molding machine, the combination with a rigid supporting-table, a spider-carrying journal situated centrally of, at right angles to and projecting above the surface thereof, a spider comprising a central portion and a series of equally-spaced radially-extending arms, said spider secured on said journal to revolve therewith, a spider-clamping nut situated on said spider-journal whereby the play of said spider is regulated, vertically-extending lugs on said arms provided with mold-carrying arm or stem receiving openings, mold-carrying arms or stems removably secured in said lug-openings to play vertically therein, crooked mold-receiving ends on the outer ends of said stems, mold eccentrically pivoted in said crooked ends and resting on the surface of said supporting-table, said table provided with a yielding mold-supporting-table opening and a mold-dumping opening situated in the path of said molds on the diametrically opposite side of said journal, a mold-supporting yielding table situated in said yielding mold-supporting-table opening, a table-supporting coil-spring, an inclosing spring-sleeve, and means for adjusting the tension of said spring, a shearing means comprising a fixed shear or knife situated to extend horizontally over the last of the series of empty molds of the mold next preceding in position to that mold situated under the die and a shear pivoted adjacent to said fixed shear, a spring for closing said shear, a vertically-extending cam-shaft, a cam on said shaft for positively operating said pivotal shear to open, and means for yieldingly operating said pivotal shear to sever the glass and for positively opening said shear, of an overhead horizontally-extending crank-shaft, a vertically-reciprocating cross-head, an extensible cross-head-connecting rod, vertically-extending cross-head guides, a die-carrying plate, vertically-extending die-plate-guiding stems, coil-springs surrounding said stems and situated between the bottom end of said cross-head and said die-carrying plate, means for adjusting the tension of said springs, a die or rammer removably secured to said plate and situated centrally over said mold-supporting yielding table, a spider-operating ratchet-wheel, a pawl, and means for operating said pawl to move said arm at regular intervals to move or traverse said mold along equal portions of its circular path.

In testimony whereof I affix my signature in presence of two witnesses.

HARRY A. DWYER.

Witnesses:
CHAS. R. BRUNT,
JOHN B. DEPHEIMER.